(12) United States Patent
Condie et al.

(10) Patent No.: US 10,586,281 B1
(45) Date of Patent: Mar. 10, 2020

(54) FINANCIAL-INFORMATION SYSTEMS, METHODS, INTERFACES AND SOFTWARE

(75) Inventors: Jeremy Condie, New York, NY (US); Robert Moitoso, Marshfield, MA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 2088 days.

(21) Appl. No.: 11/239,663

(22) Filed: Sep. 29, 2005

Related U.S. Application Data (60) Provisional application No. 60/614,571, filed on Sep. 29, 2004.

(51) Int. Cl.
| | | |
|---|---|---|
| G06Q 30/00 | (2012.01) | |
| G06Q 10/00 | (2012.01) | |
| G06Q 40/00 | (2012.01) | |
| G06Q 40/04 | (2012.01) | |
| G06Q 10/08 | (2012.01) | |
| G06Q 30/08 | (2012.01) | |

(52) U.S. Cl.
CPC ........... G06Q 40/04 (2013.01); G06Q 10/087 (2013.01); G06Q 30/08 (2013.01)

(58) Field of Classification Search
CPC ....... G06Q 40/04; G06Q 30/08; G06Q 10/087
USPC ..................................................... 705/35–40
See application file for complete search history.

(56) References Cited

U.S. PATENT DOCUMENTS

| | | | | |
|---|---|---|---|---|
| 5,101,353 | A * | 3/1992 | Lupien | G06Q 40/04 340/4.5 |
| 6,347,307 | B1 | 2/2002 | Sandhu et al. | |
| 7,212,999 | B2 * | 5/2007 | Friesen | G06Q 20/10 705/37 |

(Continued)

FOREIGN PATENT DOCUMENTS

| | | |
|---|---|---|
| GB | 2375626 | 11/2002 |
| WO | WO-01076119 A2 | 10/2001 |

(Continued)

OTHER PUBLICATIONS

Keyes, Jessica. Handbook of Technology in Financial Services. CRC Press, p. 39-6, 1998 (Year: 1998).*

(Continued)

*Primary Examiner* — Bennett M Sigmond
*Assistant Examiner* — James H Miller
(74) *Attorney, Agent, or Firm* — Faegre Baker Daniels LLP (57) ABSTRACT

Within the financial-services industry, there are online centers that allow brokers to match sellers with buyers of financial instruments based on indications of interest. However, at least some of these centers are not only limited in the types of IOIs that they provide, but also in the ways they allow IOI viewers to leverage the collective IOIs of multiple entities for a given stock or financial instrument. Accordingly, the present inventors devised systems, methods, interfaces, and software that enhance the ability of such online centers, or more generally financial-information systems, to facilitate trades. One exemplary financial-information system provides an IOI which is associated with an indicator of an enhanced or heightened willingness of its issuer to actually complete a trade, thereby expediting identification of ready trading partners. Additional features include an enhanced IOI search based on desired price or quantity and a multiparty request-for-quote function.

12 Claims, 7 Drawing Sheets

(56) References Cited

U.S. PATENT DOCUMENTS

| | | | |
|---|---|---|---|
| 7,356,500 B1* | 4/2008 | Waelbroeck et al. ............ | 705/37 |
| 7,505,915 B2* | 3/2009 | Silverman .............. | G06Q 40/00 |
| | | | 70/37 |
| 2001/0047305 A1* | 11/2001 | Bowen, Jr. ........... | G06Q 10/087 |
| | | | 705/27.1 |
| 2002/0052824 A1* | 5/2002 | Mahanti ................ | G06Q 30/06 |
| | | | 705/37 |
| 2002/0055901 A1* | 5/2002 | Gianakouros ........ | G06Q 10/109 |
| | | | 705/37 |
| 2002/0091621 A1* | 7/2002 | Conklin ................ | G06Q 20/10 |
| | | | 705/37 |
| 2002/0099645 A1 | 7/2002 | Agarwal et al. | |
| 2002/0099646 A1 | 7/2002 | Agarwal et al. | |
| 2002/0128945 A1* | 9/2002 | Moss et al. ..................... | 705/37 |
| 2002/0128955 A1 | 9/2002 | Brady et al. | |
| 2002/0178087 A1* | 11/2002 | Henderson ............ | G06Q 30/02 |
| | | | 705/26.41 |
| 2003/0009421 A1* | 1/2003 | Bansal ................... | G06Q 20/10 |
| | | | 705/39 |
| 2003/0033212 A1 | 2/2003 | Sandhu et al. | |
| 2004/0034591 A1 | 2/2004 | Waelbroeck et al. | |
| 2004/0059666 A1 | 3/2004 | Waelbroeck et al. | |
| 2004/0064420 A1 | 4/2004 | Buist | |
| 2004/0138957 A1* | 7/2004 | Bartolini ............... | G06Q 10/02 |
| | | | 705/26.1 |
| 2004/0143540 A1 | 7/2004 | Song | |
| 2004/0172356 A1* | 9/2004 | Agarwal ............... | G06Q 20/10 |
| | | | 705/37 |
| 2004/0193722 A1* | 9/2004 | Donovan ............... | H04L 51/04 |
| | | | 709/230 |
| 2005/0021445 A1* | 1/2005 | Caro .................... | G06Q 10/107 |
| | | | 705/37 |
| 2005/0055306 A1* | 3/2005 | Miller ................... | G06Q 10/10 |
| | | | 705/37 |
| 2005/0114254 A1* | 5/2005 | Condie ................. | G06Q 30/06 |
| | | | 705/37 |
| 2005/0131797 A1* | 6/2005 | Ananthanarayanan ...................... | |
| | | | G06Q 30/08 |
| | | | 705/37 |
| 2006/0282368 A1* | 12/2006 | Cai et al. ............... | G06Q 30/08 |
| | | | 705/37 |
| 2007/0100693 A1* | 5/2007 | Milman ................. | G06Q 30/02 |
| | | | 705/14.66 |
| 2007/0192227 A1* | 8/2007 | Fitzpatrick ............ | G06Q 30/08 |
| | | | 705/36 R |
| 2008/0306864 A1* | 12/2008 | Foley ................... | G06Q 20/383 |
| | | | 705/37 |

FOREIGN PATENT DOCUMENTS

| | | |
|---|---|---|
| WO | WO-03065258 A2 | 8/2003 |
| WO | WO-05052836 A1 | 6/2005 |
| WO | WO-2007041220 A2 | 4/2007 |
| WO | WO-2007041220 A3 | 4/2007 |
| WO | WO-2007103923 A2 * | 9/2007 ............. G06Q 30/06 |

OTHER PUBLICATIONS

"www.indii.com—Jun. 4, 2001", Obtained from: http://web.archive.org/web/20010604120607/http://www.indii.com/index.html, and related pages linked thereto, (At least as early as Jun. 4, 2001),13 pages.

"www.indii.com—May 29, 2002", Obtained from: http://web.archive.org/web/20020529135230/http://www.indii.com/, and related pages linked thereto, (at least as early as May 29, 2002), 13 pages.

"www.indii.com—Sep. 7, 2003", Obtained from: http://web.archive.org/web/20030907070442/http://www.indii.com/index.html, and related pages linked thereto, (At least as early as Sep. 7, 2003),11 pages.

"www.indii.com—Apr. 2, 2004", Obtained from: http://web.archive.org/web/20040402015803/http://www.indii.com/index.html, and related pages linked thereto, (At least as early as Apr. 2, 2004), 13 pages.

"www.indii.com—Apr. 28, 2004", Obtained from: http://web.archive.org/web/20040428200642/http://www.indii.com/, and related pages linked thereto, (At least as early as Apr. 28, 2004),13 pages.

"www.indii.com—Sep. 18, 2004", Obtained from: http://web.archive.org/web/20040918033105/http://www.indii.com/, and related pages linked thereto, (At least as early as Sep. 18, 2004),16 pages.

"www.indii.com—Oct. 16, 2004", Obtained from: http://web.archive.org/web/20041016134223/http://www.indii.com/index.html, and related pages linked thereto, (At least as early as Oct. 16, 2004),16 pages.

"www.indii.com13 Oct. 31, 2005", Obtained from http://www.indii.com, and related pages linked thereto, (At least as early as Oct. 31, 2005),21 pages.

Atwell, Scott , et al., "Financial Information Exchange Protocol (FIX)", *FIXML 4.4 Schema Version Guide*, Version 4.4 Schema,(Jan. 9, 2004),1-51.

"U.S. Appl. No. PCT/US06/37857, International Search Report dated Nov. 29, 2007", 7 pgs.

"U.S. Appl. No. PCT/US06/37857, Written Opinion dated Nov. 29, 2007", 11 pgs.

"NYFIX(r)—NYFIX Natural", [Online]. (c) 2006 NYFIX Inc. [archived Jul. 2, 2006]. Retrieved from the Internet: <URL: http://web.archive.org/web/20060721050620/http://www.nyfix.com/buyside-solutions/transaction-services/nyfix-natural>,1 pg.

U.S. Appl. No. 10/768,598, Non-Final Office Action dated Sep. 6, 2007, 14 pgs.

U.S. Appl. No. 10/768,598, Response filed Mar. 6, 2008 to Non-Final Office Action dated Sep. 6, 2007, 11 pgs.

U.S. Appl. No. 10/768,598, Final Office Action dated May 5, 2008, 17 pgs.

U.S. Appl. No. 10/768,598, Response filed Nov. 5, 2008 to Final Office Action dated May 2, 2008, 12 pgs.

U.S. Appl. No. 11/540,501, Response filed Mar. 3, 2009 to Election of Species Requirement dated Oct. 3, 2008, 17 pgs.

European Application Serial No. 04811776.6, Non-Final Office Action dated Sep. 15, 2006, 7 pgs.

European Application Serial No. 04811776.6, Response filed Jul. 9, 2007 to Non-Final Office Action dated Sep. 15, 2006, 13 pgs.

International Application Serial No. PCT/US2004/039115, International Search Report dated Mar. 30, 2005, 5 pgs.

International Application Serial No. PCT/US2004/039115, Preliminary Report on Patentability dated Jun. 1, 2006, 8 pgs.

International Application Serial No. PCT/US2004/039115, Written Opinion dated Mar. 30, 2005, 8 pgs.

"From Instant Messaging to Collaborative Messaging", Parlano, Inc., www.Parlano.com, (Mar. 2004), 7 pgs.

"MindAlign for Microsoft Office Live Communication Servier 2003", Parlano, Inc., www.Parlano.com, (2003), 10 pgs.

"Next Generation Communication", Parlano, Inc., www.Parlano.com, (Oct. 2004), 9 pgs.

"Thomson Financial Integrates Trade and Transaction Services Within Thomson One: Thomson AutEx for Buy Side Traders Integrated Within Thomson One Open Framework", http://web.archive.org/web/20040610234032/http://www.advisorpage.com/modules.php?name=News&file=print&sid=1042, (Oct. 13, 2003; archived Jun. 10, 2004)), 3 pgs.

* cited by examiner

400 corresponding to one or more embodiments of the present invention.
FINANCIAL-INFORMATION SYSTEMS, METHODS, INTERFACES AND SOFTWARE

RELATED APPLICATION

This application claims priority to U.S. Provisional Application 60/614,571, which was filed Sep. 29, 2004 and which is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2004, Thomson Financial, Inc.

BACKGROUND

The 1990s witnessed a rapid proliferation of computer technology into homes and businesses. During this time, computers, fueled by growth of the much-heralded Internet, advanced from facilitating tasks, such as word processing and bookkeeping, to become everyday communications tools, fast approaching the commonness of telephones and televisions. As a result, virtually every sector of public, private, and commercial life has been affected in some way by the power and reach of today's computer technology.

The financial-services industry, for example, has recently seen not only the emergence of Internet-based trading platforms that allow online trading of stocks, bonds, and commodities, but also the emergence of online listing centers that allow brokers to match sellers with buyers of securities based on listed "indications of interest" or IOIs. A seminal example of such an online center is the AutEx™ service from Thomson Financial of New York, N.Y. This service provides a secure and convenient means for investment firms and large-block traders to broadcast their desires, or interests, in purchasing or selling particular stock or other security instruments to a group of securities traders (buyside traders.) Traders viewing these indications in an online list can then respond by communicating with contacts at these investment firms or to begin negotiations and ultimately complete the transactions.

However, the present inventors have recognized that systems, such as the AutEx system, while successful, are limited in at least two ways.

First, online listing systems are limited in the types of IOIs that they provide. For example, the AutEx system provides three types of IOIs, a general IOI which identifies a stock and a general number of shares, such as large, medium or small; a super IOI which identifies a stock and a specific number of shares, but no price; and a natural IOI which identifies a stock, a specific number of shares, and a price. In all cases, traders responding to listed IOIs have no indication of how willing the issuer of the IOI is to actually complete a trade. As such, traders are at risk of wasting time responding to IOIs that may not yield actual transactions.

Second, online listing systems are limited in the ways they allow IOI viewers to leverage the collective IOIs of multiple entities for a given stock. For example, within the AutEx system, an IOI viewer wishing to privately contact several parties regarding their respective IOIs for a particular stock would need to expend considerable time initiating separate communications to each party or separately reviewing and judging responses from each party, typically via phone, fax, email, or instant messaging.

Accordingly, the present inventors have recognized a need for better ways of using IOIs to facilitate trading.

SUMMARY

To address this and/or other limitations, the present inventors devised systems, methods, interfaces, and software that enhance the ability of financial-information systems, such as the AutEx system, to facilitate trades. One exemplary financial-information system provides an indication of interest (IOI) which is associated with an enhanced or heightened willingness of its issuer to actually complete a trade, thereby expediting identification of ready trading partners. In some embodiments, this new form of IOI, an executable IOI, is also associated with a presence indicator that indicates whether a trader associated with the indication is currently available to communicate via instant messaging or other communication mode with presence detection.

Additional features include an enhanced IOI search based on desired price or quantity and a multiparty request-for-quote function. The enhanced IOI searching prioritizes or ranks search results based on IOI type and price or quantity criteria. The request-for-quote function allows users to search for relevant IOIs, select one or more of those IOIs for further inquiry, and simultaneously request quotes from the entities associated with the selected IOIs, thereby initiating an online auction among interested buyers or sellers for a given stock or other economic instrument.

Ultimately, one of more of these or other disclosed embodiments promise improved efficiency and convenience of online interactions for financial trading partners.

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Financial-Information System

Figure 1:
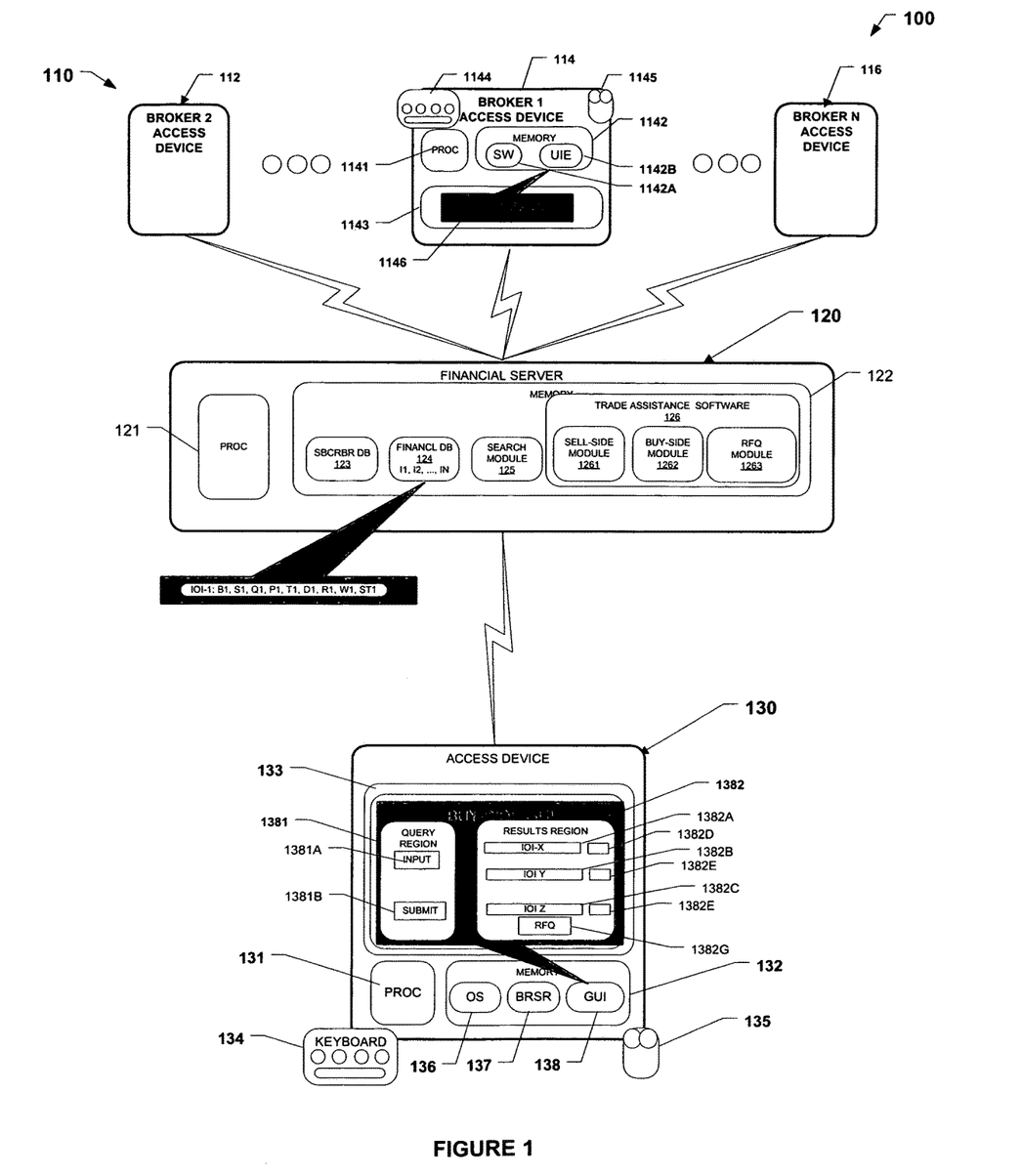
FIG. 1 is a block diagram of an exemplary financial-information system 100 corresponding to one or more embodiments of the present invention.

FIG. 1 depicts an exemplary financial-information system 100 that corresponds to one or more embodiments of the present invention. System 100 includes sell-side access devices 110, a financial server 120, and one or more buy-side access devices 130.

Sell-Side Access Devices

Specifically, sell-side access devices 110 include one or more access devices, of which access devices 112, 114, and 116 are generally representative. In the exemplary embodiment, each access device takes the form of a personal computer, workstation, personal digital assistant, mobile telephone, or any other device capable of providing an effective user interface with a server or database via wireline or wireless communication link, such as a local-, wide-, private-, or virtual-private network.

More specifically, access device 114, which is generally representative of, though not necessarily identical to, devices 112 and 116, includes a processor module 1141, a memory 1142, a display 1143, a keyboard (or keypad) 1144, and a graphical pointer or selector 1145. Processor module 1141 includes one or more processors, controllers, or processing circuits. Memory 1142 includes software 1142A, such as an operating system and/or browser, and a set of one or more user-interface elements UIEs 1142B. Software 1142A and UIEs 1142B together define a graphical user interface 1146 that works in conjunction with keyboard 1144 and selector 1145. One or portions of interface 1146 enable users to not only define and transmit novel indications of interest (IOI) data structures, but also respond to related requests for quotations from buy-side users who access the IOI data structures.

In the exemplary embodiment, the indications of interest (IOIs) concern buying, selling, or otherwise transacting in one or more economic or financial instruments, such as stocks, bonds, commodities, options, derivatives, and so forth, from one or more specified or unspecified economic trading entities or parties, such as individual investors, individual brokers, brokerage firms, retail banks, investment banks, mutual-fund operators, venture capitalists, etc. In some embodiments, the IOIs may represent other forms of pre-trade or commercial data. For instance, some embodiments may include listings related to the sale or purchase of other forms of property, such as consumer goods or services, or real property.

Access devices 110 are coupled or couplable, for example, via an Internet Protocol (IP) network or other form of permanent, temporary, dedicated, shared wireless or wireline communication link to financial server 120.

Exemplary Financial Server

Server 120, which is generally representative of one or more servers for serving data in the form of webpages, or other markup language forms with associated applets, ActiveX controls, remote-invocation objects, or other related software and data structures to service clients of various "thicknesses." Some embodiments transmit data to and from the server using a version of the Financial Information Exchange (FIX) protocol. More particularly, server 120 includes a processor module 121, a memory module 122, a subscriber database 123, a search module 124, a financial database 124, and a trade-assistance module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores a subscriber database 123, a financial database 124, a search module 125, and trade-assistance software 126.

Subscriber database 123 includes subscriber-related data for controlling, administering, and managing pay-as-you-go or subscription-based or entitlement-based access to one or more databases or other features or functionality accessible via server 120.

Financial database 124 includes one or more IOI data structures, such as a representative data structure 1241, based on submissions from uses of access devices, such as access devices 110. In the exemplary embodiment, data structure 1241 includes an identifier field or portion, such as IOI-1, that is logically associated with one or more fields or portions, author identification field A1, security identification field S1, quantity field Q1, price field P1, time stamp field T1, IOI duration field D1, recipient field R1, willingness-to-trade field W1, and IOI status field ST1. Willingness-to-trade field may contain one or more values indicative of the IOI author's willingness to complete a trade based on the transactional parameters associated with other fields of the IOI data structure.

Search module 125 includes one or more search engines and related user-interface components, for receiving and processing user queries against one or more of databases 110. In the exemplary embodiment, one or more search engines associated with search module 123 facilitate searching of IOI database 124 using a structured query language.

Trade-assistance software 126 includes a sell-side module 1261, a buy-side module 1262, and a request-for-quote module 1263. (Further description of the sell-side, buy-side, and request-for-quote module and their exemplary operation is provided below with aid of FIG. 2.)

Server 120 is communicatively coupled or couplable via a wireless or wireline communications network, such as a local-, wide-, private-, or virtual-private network, to one or more accesses devices represented generally by access device 130.

Buy-Side Access Device

Access device 130 includes a processor module 131 and memory module 132, a display 133, a keyboard 134, and a graphical pointer or selector (mouse) 135.

Specifically, processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer; however, other embodiments use other commercial or non-commercial operating systems and/or browsers. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query region 1381 and a search-results region 1382. Query region 1381 is defined in memory and upon rendering includes one or more interactive control features (elements or widgets), such as input region 1381A and a query submission button 1381B. Input region 1381A accepts user input, such as company name or stock ticker symbol, defining a query for relevant IOI (and/or advertised trade) information from database 125. And submission button 1381B, upon activation, causes communication of the query to server 120 for processing.

Search-results region 1382 is also defined in memory and upon rendering displays IOI listings 1382A-1382C from IOI database 125 next to respective interactive control or selection features 1382D-1382F for use in selecting one or more of the IOI listings. Additionally region 1382 includes a control feature 1382G, for example a button, for initiating a request for quote from entities associated with one or more of IOI listings selected using selection features 1382D-1382F. Although FIG. 1 shows query region 1381 and results region 1382 as being simultaneously displayed, some embodiments present them at separate times.

Exemplary Methods of Operation

Figure 2:
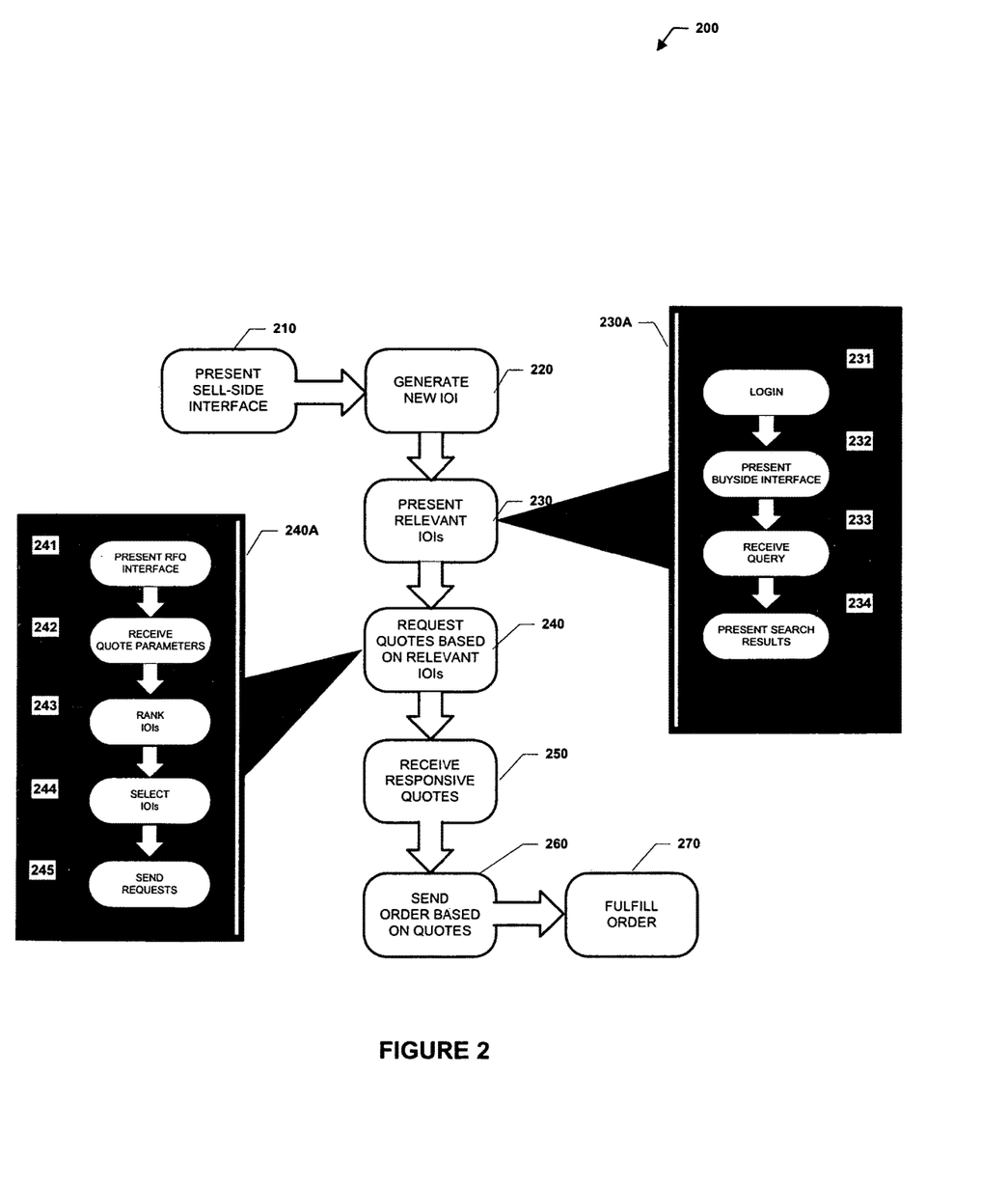
FIG. 2 is a flow chart 200 illustrating one or more exemplary methods of operating a financial-information system and corresponding to one or more embodiments of the present invention.

FIG. 2 shows a flow chart 200 of one or more exemplary methods of operating system 100. Flow chart 200 includes blocks 210-270, which are arranged and described in a serial sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

Block 210 entails presenting a sell-side user interface via to one or more sell-side users. In the exemplary embodiment, this entails a user directing a browser in a sell-side access device, such as access device 114, to internet-protocol (IP) address corresponding to financial server 120 and then logging onto the system. Successful login results in one or more portions of a web-based interface, such as interface 1146 in FIG. 1 or interface 300 in FIG. 3 (or one or more portions thereof) being output from server 120, stored in memory 1142, and displayed by access device 114.

Figure 3:
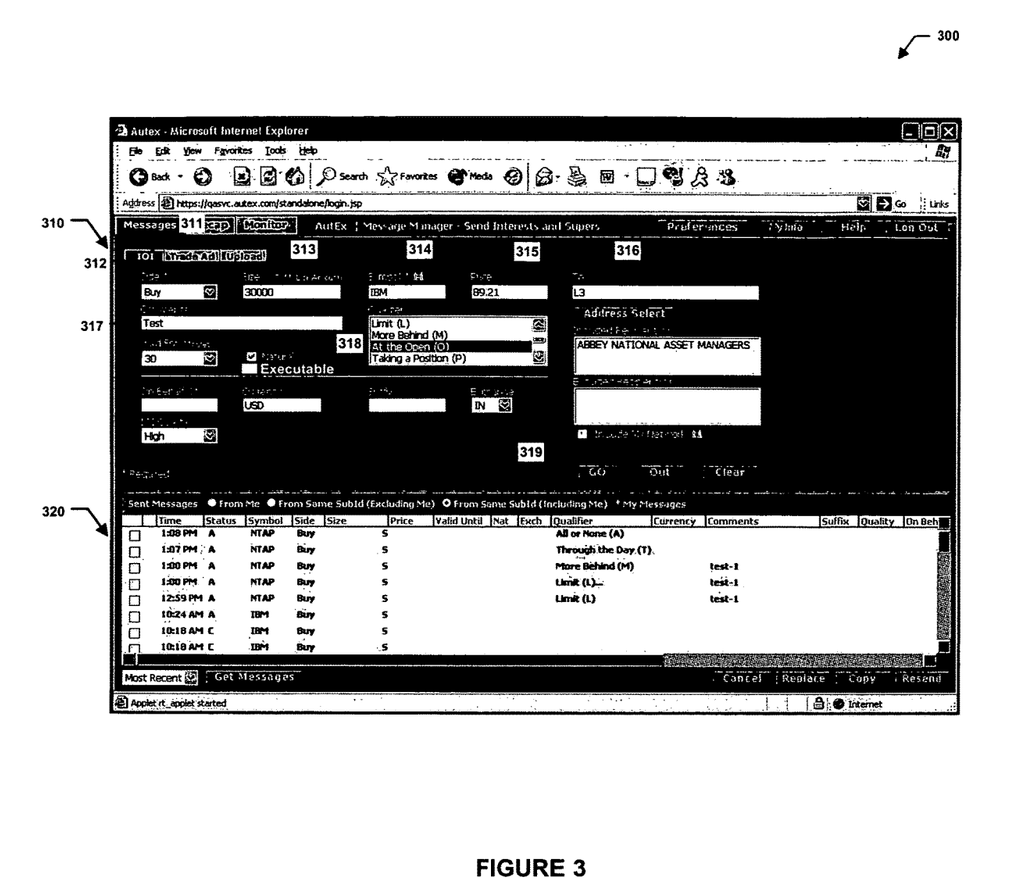
FIG. 3 is a facsimile of an exemplary graphical-user interface 300 corresponding to one or more embodiments of the present invention.

As shown in FIG. 3, interface 300 includes a number of interactive control features, such as text input fields or pull down menus, for defining and communicating an IOI. In the exemplary embodiment, interface 300 includes a new-message generation region 310 and a sent-message review region 320.

New-message generation region 310 includes: a message type control feature 311 for defining the new message as an indication of interest (IOI); a side-selection feature 312 for defining the new message as originating from the buy-side or sell-side; a size input feature 313 for categorizing a quantity of shares as small, medium, or large or for inputting a specific quantity of shares; a symbol input or select feature 314 for inputting or selecting an entity instrument identifier, such as a stock symbol; a price input or select feature 315 for inputting or selecting a price; an addressee input or select feature 316 for inputting or selecting one or more recipients of the message; a duration input or select feature 317 for inputting or selecting duration or life of the message; an IOI type input or selection feature 318, such as radio button or checkbox, for inputting or selecting the IOI type as a natural or as an executable IOI; and a new-message transmission feature 319, such as a go button, for initiating transmission of a message as defined in region 310.

In some embodiments, region 310 includes a willingness-to-trade W input or selection feature for entering or selecting an indicator of willingness to complete a trade based on the symbol, quantity, price, and/or other parameters defining the IOI message. In some embodiments, the willingness may be on a scale of one to three, one to five, or one to ten, with one being the lowest level of interest or willingness and three, five, or ten being the highest. In some embodiments, the highest level of willingness creates an contractually binding offer, whereas in others, failure to complete the trade results in association of the sender with a demerit indicator or demerit score. In the exemplary embodiment, IOIs associated with the highest willingness are referred to as "executable IOIs."

Block 220 entails generating one or more new IOIs. In the exemplary embodiment, this entails a sell-side user defusing one or more new IOIs, using the sell-side user interface. One or more of the defined IOIs is associated with an indication of heightened willingness of the user to complete a transaction based on corresponding IOIs. Each defined IOI is then submitted to server 120 for storage in database 124. (In some embodiments, executable IOIs are routed to an Order Management System.) Execution continues at block 230.

Block 230 presents relevant IOIs to one or more users. In the exemplary embodiment, this entails execution of the subprocess shown in block 230A, which includes process blocks 231-234. Block 231, designated login, entails each user directing a browser or other access software on a respective access device, such as access device 130, to a webserver, such as server 120, and subsequently logging into the system using appropriate username, password, and/or other authentication techniques. Block 232, which is executed in response to a successful login, entails outputting an interface, such as interface 138 in FIG. 1 (or one or more portions thereof) from server 120 to access device 130 for display. Block 233 entails receiving a query for IOIs or advertised trades related to one or more financial or economic instruments via query region 1381 (in FIG. 1), and block 234 entails presenting search results based on the received query via results region 1382.

Figure 4:
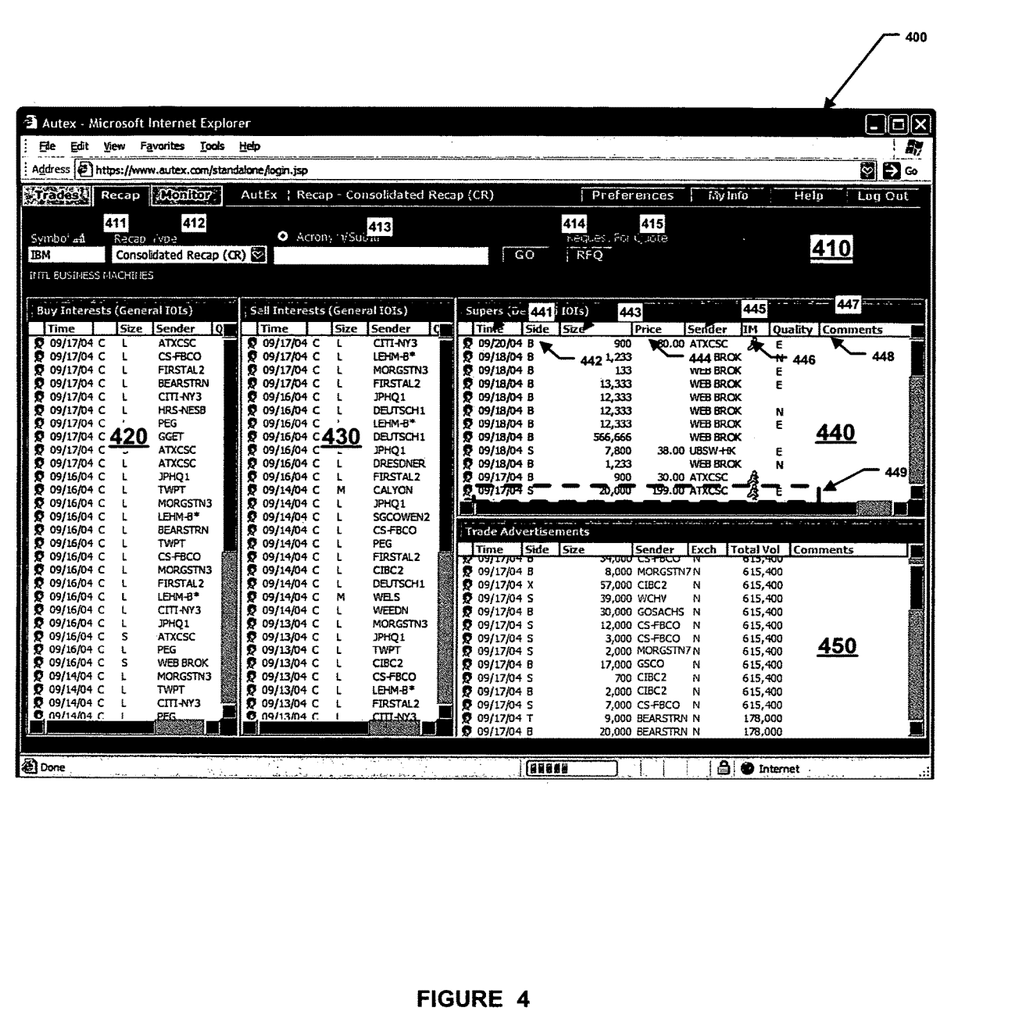
FIG. 4 is a facsimile of exemplary graphical user interface 400 corresponding to one or more embodiments of the present invention.

FIG. 4 shows an alternative interface 400 for submitting a query and/or receiving query results. Interface 400 includes an interactive control or query region 410, a general buy-interest region 420, a general sell-interest region 430, and a detailed-interest region 440, and an advertised trade region 450.

Query (or recap-control) region 410 includes security symbol input region 411, a recap-type region 412, a sellside-contributor filter region 413, a command-submission feature 414, and a request-for-quote command input 415. Symbol input region 411 accepts stock or other financial instrument or company identification symbols, such as IBM—the ticker symbol for International Business Machines of Armonk, N.Y. In some embodiments, region 412 takes the form of a pull-down menu listing all available ticker symbols or a predefined subset of symbols, for example, those most recently used and/or those from a user-defined watchlist. Recap-type region 412 accepts a data-type descriptor or name, such as Consolidated Recap, which designates the type and form of data the user desires. In the exemplary embodiment, this region provides a number of possible options in the form of a pull-down menu. However, other embodiments may use other user-interface features for presenting such options.

The command-submission feature 414, for example, a "go" button, is selectable to invoke submission of data from input region 411 and 412 to server 120 or more precisely IOI database 125 (in FIG. 1.) In response, the server populates general buy-interest region 420, general sell-interest region 430, detailed-interest 440, and advertised trade region 450 with corresponding data sets related to the content of input regions 412 and 414.

Notably, each region lists one or more indications of interest and corresponding presence indicators. (For further details, see copending and co-owned patent application Ser. No. 10/768,598, which was filed on Jan. 30, 2004.) Additionally, detailed-interest region 440 includes one or more indication listings, one or more of which are associated with a respective time stamp 441, a buy-or-sell-side indicator 442, a size indicator 443, an optional price indicator 444, a sender identifier 445, a presence indicator 446, a quality or trade-willingness indicator 447, and a comment string 448.

For example, indication of interest 449, which was issued on Sep. 14, 2004 by a sell-side entity, indicates an interest in 20,000 shares (of IBM stock) at per-share price of 199.00. The sender, identified as ATXCSC, is presently available on the AOL Instant Message service (as indicated by the AOL Running man symbol), and the quality of the IOI is indicated as "E" for executable, meaning that ATXCSC (or an associated trader) is willing to execute an order for 20,000 shares of IBM at the listed price of 199.00. (Although region 440 is shown as including only natural (N) and executable (E)—type IOIs, other embodiments, additionally present general and super IOIs on the same screen. Also, in some embodiments, each of the column headers in region 440 is selectable to initiate sorting of the IOI listings based on particular column; and still other embodiments, include IOI filter features to include or exclude each of the different types of IOIs. In the exemplary embodiment, one or more of the IOIs, including at least one of the executable IOIs is associated with a presence indicator indicating whether an entity associated with the IOI, or more precisely a computing device associated with an IP address associated with the entity, is present on a communications network.

Advertised trade region 450 lists data regarding one or more completed or advertised trades that are relevant to the symbol input data of field 411. With selection of request-for-quote button 415 (in region 410), execution continues at block 240 (in FIG. 2.)

Block 240 entails requesting quotes from one or more traders based on their submitted IOIs or advertised trades. In the exemplary embodiment, this entails execution of the subprocess shown in block 240A, which includes process blocks 241-245.

Figure 5:
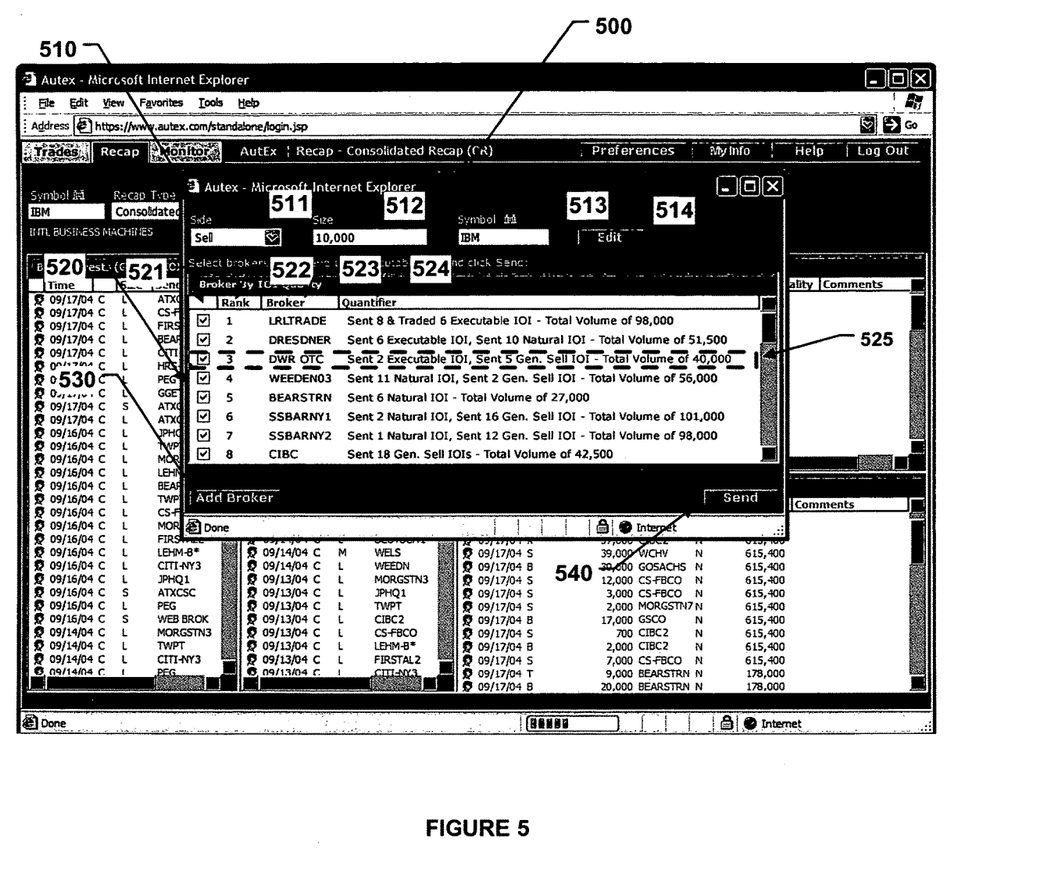
FIG. 5 is a facsimile of exemplary graphical user interface 500 corresponding to one or more embodiments of the present invention.

Block 241 entails presenting a request-for-quote (RFQ) interface entails outputting an interface, such as interface 500 in FIG. 5, from server 120 to access device 130 for display. Interface 500 includes quote-definition region 510, a broker listing region 520, an add-broker control feature 530, and a send-RFQ control feature 540. Blocks 242-245, which are completed or initiated in the context of interface 500, respectively entail receiving quote parameters via broker listing region 520, ranking brokers based on past IOI and trade activities in a given security (as in broker-listing region 530, selecting brokers using selection features of broker-listing region 530, and sending request-for-quotes through selection of send-RFQ control feature 540.

More specifically, FIG. 5 shows that quote-definition region 510 includes a buy-or-sell-side input or selection feature 511 for inputting or selecting whether the request concerns buying or selling; a size input or selection feature 512 for inputting or selecting a quantity or amount; a symbol input or selection feature 513 for inputting or selecting a stock symbol or other financial or economic instrument identifier; and an edit button 514 for initiating an edit operation relative to one or more of features 511-513.

Broker-listing region 520 includes rows and columns of data, with each row corresponding to a particular broker or trader. More specifically, region 520 includes four columns of data: a selection column 521, a rank column 522, broker-identification column 523, and a quantifier column 524. Selection column 521 includes a number of selection elements, such as check boxes, for each listed broker. Rank column 522 lists the rank of each corresponding broker in terms of the similarity of their past or present IOIs and/or advertised trades to the terms of quote parameters in region 510. Some embodiments compute a ranking based on weighted volumes of relevant advertised trades and/or relevant IOIs. In one weighting scheme, completed trade volumes are weighted at 100%, executable IOI volume is weighted at 75%, natural IOI volumes weighted at 50%, super IOIs weighted at 10%, and general indications weighted at 5% or not at all.

Broker-identification column 523 provides an identifier or name for the brokers associated with each row. And, quantifier column 524 provides a summary of the IOI and advertised trade information for each broker. For example, a broker listing 525 shows that broker DWR OTC is ranked third, based on its prior submission of 2 executable IOIs and 5 general sell IOIs, representing total volume of 40,000 shares of IBM stock.

Add-broker control feature 530 provides a command input that enables the user to add unlisted brokers to broker-listing region 520. In the exemplary embodiment, add-broker control feature 430 takes the form of a button, and invokes display of a user-preferred or generic list of brokers. In some embodiments, broker-listing region 520 only lists brokers based on data that meets certain temporal criteria, for example, less than a day old, and the add-broker control feature initiates display of a list of brokers associated with older activity for the subject financial instrument.

Send-RFQ control feature 540 is selectable to initiate submission of the request for quote to one or more of the brokers indicated via selection of selection elements, such as check boxes, in column 521. In some embodiments, the selection of control feature 540 results in transmission of an email or instant message to each listed broker, with the text of the email or instant message based on the parameters in quote-definition region 510. In some embodiments, quote-definition region 510 includes a region for inputting or selecting a time period or duration of the period for submission of quotes, such as 20 seconds, 30 seconds, 45 seconds, one minute, 5 minutes, 10 minutes, etc. However, in other embodiments, the time period is set via an administrative authority to a default value such as 30 seconds.

Some embodiments enable the RFQ submitter to upload a list or portfolio of instruments and have the list in its entirety sent to a list of brokers. For this scenario, users may designated a longer RFQ period, such as hours or even days. Some variants of these embodiments automatically divide the list, sending each listed instrument to one or more brokers based on their current or past IOIs and/or advertised trades in the corresponding instrument. Additionally, some embodiments initiate display of an interface in response to the send-RFQ command that allows the user to designate the mode of communications as email, fax, instant message, and/or pager. Selection of control feature 540 advances execution to block 250 (in FIG. 2.)

Block 250 entails receiving quotes from one or more brokers in response to the requests for quotes. In the exemplary embodiment, this entails server 120 receiving the responses from access devices, such as devices 112, 114, and 116, and providing them to access device 130 in the context of an interface, such as interface 600 in FIG. 6.

Figure 6:
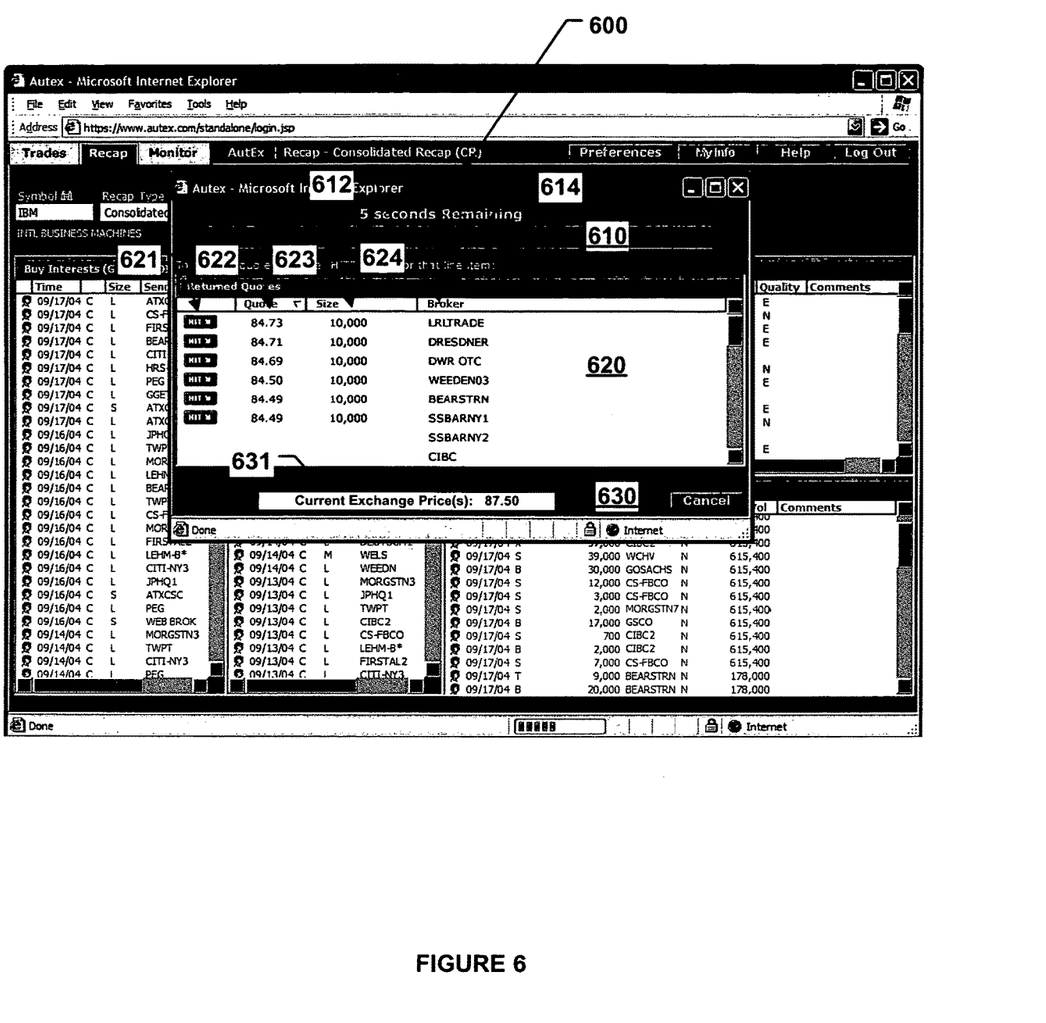
FIG. 6 is a facsimile of exemplary graphical user interface 600 corresponding to one or more embodiments of the present invention.

Interface 600 includes a time-indication region 610, a quote-listing region 620, and a market-information region 630. Time-indication region 610 indicates time remaining for the recipients of the request-for-quote to submit quotes. In the exemplary embodiment, time-indication region 610 includes a time-indicator text field 612 and a time-indicator graphic 614. Time-indicator graphic 614, for example, a bar or clock face, indicates elapsed as well as remaining time. Quote-listing region 620 provides a listing of each of the one or more received quotes, organized as rows and columns, in descending order of the quoted price. The listing enables a users, such as an asset manager, to quickly see who is making the best market in a specific stock or other economic instrument.

More precisely, region 620 includes a quote selection column 621, a quote price column 622, a size column 623, and a broker identification column 632. Quote selection column 621 includes a quote selection feature, for example a button, for each of the one or more listed quotes. Quote price column 622 includes a quote price for each of the listed quotes. Quote size column 623 includes a quote size or quantity for each of the listed quotes.

Market-information region 630 provides one or more market news feeds, such as market price feed 631. In the exemplary embodiment, the market price feed is a real-time price feed from a particular financial exchange, such as the American Stock Exchange, New York Stock Exchange, National Association of Securities Dealers Automated Quotation System. In some embodiments, multiple price feeds are provided. And in still others, two or more price feeds are combined to define one or more composite or average prices feeds. In some embodiments, market-information region 630 includes other types of feeds, such as news feeds, which provide relevant information.

Selection of a quote selection feature in column 621 for a corresponding quote results in execution of block 260 in FIG. 2. (Some embodiments may include control logic or lockouts to prevent erroneous acceptance of bids or prevent acceptance of bids deemed to be 'bad' based on prevailing market conditions.)

Block 260 entails sending an order based on the selected quote to the broker listed in the quote or other designated entity. In the exemplary embodiment, this entails sending a notification or acceptance message from access device 130 to server 120, which in turn communicates the acceptance to the broker via one of access devices 110. The broker (or an agent for the broker) then initiates fulfillment of the order by forwarding it own to an order management system. In some embodiments, the order is sent directly to an order management system (not shown), bypassing the broker to accelerate processing. Execution then advances to block 270.

Figure 7:
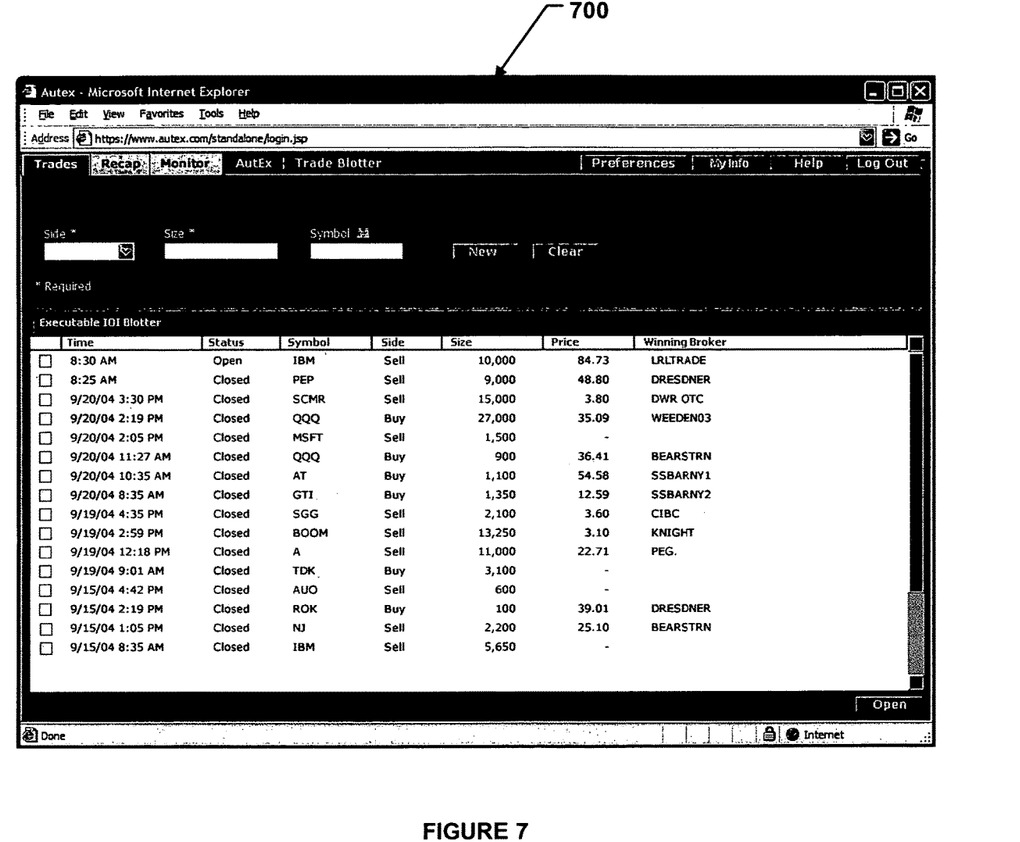
FIG. 7 is a facsimile of exemplary graphical user interface 700 corresponding to one or more embodiments of the present invention.

Block 270 entails fulfilling the order. In the exemplary embodiment, this entails completing the trade and automatic updating the advertised trade section KM database 125 to reflect completion of the trade. Other embodiments update the RN database regarding the completed trade only after requesting and receiving permission from the broker to do so. Permission can be requested via an automated email or instant message. FIG. 7 shows an exemplary interface 700, which includes a listing or blotter of completed trades.

CONCLUSION

In furtherance of the art, the present inventors have recognized that online listing centers that allow brokers to match sellers with buyers of securities based on listed "indications of interest" or IOIs are not only limited in the types of IOIs that they provide, but also in the ways they allow IOI viewers to leverage the collective IOIs of multiple entities for a given stock. Accordingly, the present inventors have devised and presented herein systems, methods, interfaces, and software that enhance the ability of financial-information systems, such as the AutEx system, to facilitate trades. One exemplary system provides an indication of interest (IOI) which is associated with an enhanced or heightened willingness of its issuer to actually complete a trade, thereby expediting identification of ready trading partners. Additional features include an enhanced IOI search based on desired price or quantity and a multiparty request-for-quote function.

Ultimately, one of more of these or other embodiments promise improved efficiency and convenience of online interactions not only for financial trading partners and others in the financial-services industry, but also for those in any private, public, and commercial domain where rapid or convenient online communication is desirable.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A method implemented by a server, the server including a processor and a memory storing a database, the method comprising:

receiving, by the server, a first electronic signal representing a first indication of interest (IOI) data structure for an economic instrument, the first IOI data structure formatted for transmission via a Financial Information Exchange (FIX) protocol and including data indicating the economic instrument and an associated first trader, first price, first quantity of the economic instrument, and first willingness to trade indicator;

receiving, by the server, a second electronic signal representing a second IOI data structure for the economic instrument, the second IOI data structure formatted for transmission via the FIX protocol and including data indicating the economic instrument and an associated second trader, second price, second quantity of the economic instrument, and a second willingness to trade indicator;

storing, by the server, the first and the second IOI data structures in the database;

displaying a ranking of the first trader and the second trader, wherein the ranking is determined based on past IOI submissions and trade activity;

receiving a command to send a request-for-quote (RFQ) to the first trader and the second trader;

sending the RFQ to the first trader and the second trader, wherein the RFQ includes an active time period;

displaying, on a display device, the first IOI data structure and the second MI data structure being limited based on the ranking of the first trader and the second trader, wherein the first IOI data structure and the second IOI data structure are displayed during the active time period;

receiving a quote selection command for the economic instrument, in response to the RFQ; and executing an order for the economic instrument by bypassing a broker, in response to receiving the quote selection command.

2. The method of claim 1, wherein the executing the order for the economic instrument is further in response to the first IOI data structure and the second IOI data structure.

3. A server comprising:
one or more processors;
memory coupled to the one or more processors;
a database stored on the memory; and
a first interface and a second interface stored on the memory and configured to be outputted to a client access device for display, wherein the one or more processors operate with the memory to:

receive a plurality of indications of interest (IOI) data structures each for the same economic instrument, each IOI data structure including data identifying the economic instrument, a trader, a price, a quantity of the economic instrument, and a willingness to trade indicator;

store in the database each of the received plurality of IOI data structures;

display, via the first interface, the IOI data structures including the willingness to trade indicator;

display, via the second interface, a ranking of the traders associated with the IOI data structures for the economic instrument;

send a request-for-quote and associated parameters, including an active time period, to a plurality of the traders;

receiving a quote selection from one of the plurality of the traders; and initiate an order responsive to the quote selection, and fulfilling the order.

4. The server of claim 3, wherein the one or more processors operate with the memory to:

sort for display, via the first interface, the IOI data structures by the willingness to trade indicator associated with the economic instrument.

5. The server of claim 3, wherein at least some of the willingness to trade indicators associated with the economic instrument are executable indicators, wherein least some of the other willingness to trade indicators associated with the economic instrument are general indicators.

6. The server of claim 3, wherein the RN data structures are transmitted to the server via the Financial Information Exchange (FIX) protocol.

7. The server of claim 3, wherein the ranking of the traders is based on the traders' past IOI data structures.

8. The server of claim 7, wherein, for the ranking, the past IOI data structures associated with an executable willingness to trade indicator are weighted higher than IOI data structures associated with other willingness to trade indicators.

9. The server of claim 7, wherein the ranking is further based on the traders' completed trade volumes.

10. The server of claim 3, wherein the ranking of the traders is based on similarity of past IOI data structures with the associated parameters of the request-for-quote.

11. The server of claim 3, wherein the one or more processors operate with the memory to:

display, via the first interface, a presence indicator of each of the traders associated with the economic instrument.

12. The server of claim 3, wherein the one or more processors operate with the memory to:

display, via a third interface stored on the memory, a listing of the received request-for-quotes in rank order based on price associated with the request-for-quotes.

\* \* \* \* \*